United States Patent
Thubert et al.

(10) Patent No.: US 11,310,017 B2
(45) Date of Patent: Apr. 19, 2022

(54) PREEMPTIVE EXPECTATION MESSAGE FOR TRIGGERING TRANSMISSION OF EXPECTED MESSAGE IN DETERMINISTIC WIRELESS NETWORK

(71) Applicant: Cisco Technology, Inc., San Jose, CA (US)

(72) Inventors: Pascal Thubert, Roquefort les Pins (FR); Eric Michel Levy-Abegnoli, Valbonne (FR)

(73) Assignee: CISCO TECHNOLOGY, INC., San Jose, CA (US)

(*) Notice: Subject to any disclaimer, the term of this patent is extended or adjusted under 35 U.S.C. 154(b) by 152 days.

(21) Appl. No.: 16/747,399

(22) Filed: Jan. 20, 2020

(65) Prior Publication Data

US 2021/0211258 A1    Jul. 8, 2021

Related U.S. Application Data

(60) Provisional application No. 62/956,573, filed on Jan. 2, 2020.

(51) Int. Cl.
*H04L 5/00* (2006.01)
*H04W 72/04* (2009.01)
(Continued)

(52) U.S. Cl.
CPC ....... *H04L 5/0053* (2013.01); *H04W 72/0446* (2013.01); *H04W 74/004* (2013.01)

(58) Field of Classification Search
CPC ... H04L 5/0053; H04L 5/0075; H04L 5/0082; H04W 72/0446; H04W 74/04
See application file for complete search history.

(56) References Cited

U.S. PATENT DOCUMENTS 9,258,097 B2   2/2016   Wetterwald et al.
9,439,142 B2   9/2016   Zhu et al.
(Continued)

OTHER PUBLICATIONS

Tuset-Peiro et al., "LPDQ: A self-scheduled TDMA MAC protocol for one-hop dynamic low-power wireless networks", Sep. 28, 2014, [online], Pervasive and Mobile Computing 20 (2015), [retrieved on Jan. 21, 2020]. Retrieved from the Internet: URL: <https://www.sciencedirect.com/science/article/abs/pii/S1574119214001576?via%3Dihub>, p. 84-99.

(Continued)

*Primary Examiner* — Faruk Hamza
*Assistant Examiner* — Abusayeed M Haque
(74) *Attorney, Agent, or Firm* — Leon R. Turkevich

(57) ABSTRACT

In one embodiment, a method comprises: identifying, by a receiving network device, a deterministic schedule comprising allocated time slots, each allocated time slot allocated for the receiving network device receiving a data packet from one of a plurality of transmitting network devices in a wireless deterministic data network; and selectively transmitting, by the receiving network device, an expectation message at initiation of each of the allocated time slots, each expectation message preempting transmission by any other network device during the corresponding allocated time slot, each expectation message generated by the receiving network device and identifying a corresponding transmitting network device that is expected to deterministically transmit a corresponding expected data packet to the receiving network device during the corresponding allocated time slot; the expectation message causing the corresponding identified transmitting network device to transmit the corresponding expected data packet during the corresponding allocated time slot.

18 Claims, 4 Drawing Sheets

(51) Int. Cl.
*H04W 74/04* (2009.01)
*H04W 74/00* (2009.01)

(56) References Cited

U.S. PATENT DOCUMENTS

| | | | |
|---|---|---|---|
| 9,723,516 | B2 | 8/2017 | Bhushan et al. |
| 9,859,970 | B2 | 1/2018 | Thubert et al. |
| 10,009,793 | B2 | 6/2018 | Wetterwald et al. |
| 10,218,602 | B2 | 2/2019 | Levy-Abegnoli et al. |
| 10,244,525 | B2 | 3/2019 | Thubert et al. |
| 2017/0041957 | A1* | 2/2017 | Pazhyannur .............. H04L 1/203 |
| 2018/0103094 | A1 | 4/2018 | Wetterwald et al. |
| 2018/0124656 | A1* | 5/2018 | Park .................. H04W 36/0072 |
| 2018/0176922 | A1 | 6/2018 | Li et al. |
| 2019/0037506 | A1* | 1/2019 | Singh ..................... H04W 28/16 |
| 2019/0109797 | A1 | 4/2019 | Thubert et al. |
| 2019/0306878 | A1* | 10/2019 | Zhang .................. H04L 1/1812 |
| 2019/0313453 | A1* | 10/2019 | Baron ............... H04W 74/0816 |
| 2019/0334644 | A1 | 10/2019 | Thubert et al. |
| 2019/0357026 | A1* | 11/2019 | Hwang ................... H04W 4/02 |
| 2020/0029324 | A1* | 1/2020 | Nezou ............... H04W 72/0413 |
| 2020/0037190 | A1* | 1/2020 | Wu .................... H04W 28/0278 |
| 2021/0112384 | A1* | 4/2021 | Baek ....................... H04W 4/23 |
| 2021/0204324 | A1* | 7/2021 | Viger .................. H04W 72/121 |

OTHER PUBLICATIONS

Wikipedia, "Automatic repeat request", Dec. 2, 2019, [online], [retrieved on Dec. 27, 2019]. Retrieved from the Internet: URL: <https://en.wikipedia.org/w/index.php?title=Automatic_repeat_request&printable=yes>, pp. 1-2.

Wikipedia, "IEEE 802.11ax", Dec. 13, 2019, [online], [retrieved on Dec. 23, 2019], Retrieved from the Internet: URL: <https://en.wikipedia.org/w/index.php?title=IEEE_802.11ax&printable=yes>, pp. 1-8.

* cited by examiner

//  # PREEMPTIVE EXPECTATION MESSAGE FOR TRIGGERING TRANSMISSION OF EXPECTED MESSAGE IN DETERMINISTIC WIRELESS NETWORK

This application claims priority to Provisional Application No. 62/956,573, filed Jan. 2, 2020.

TECHNICAL FIELD

The present disclosure generally relates to generation and transmission of a preemptive expectation message for triggering transmission of an expected message in a deterministic network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

The Internet Engineering Task Force (IETF) is attempting to propose standards that can be applied to wireless devices for the stringent requirements of deterministic networks (e.g., minimal jitter, low latency, minimal packet loss). The IETF has proposed a routing protocol ("6TiSCH") that provides IPv6 routing using time slotted channel hopping (TSCH) based on IEEE 802.15.4e, enabling network devices to use low-power operation and channel hopping for higher reliability.

"RAW" (reliable and available wireless) is another Working Group at the IETF that is attempting to develop deterministic wireless operations using, for example, IEEE 8021 EHT (Extremely High Throughput), 3GPP Ultra-Reliable Low-Latency Communication (URLLC), and 6TiSCH.

A fundamental problem of existing wireless deterministic network protocols is that they all utilize an Automatic Repeat Query (ARQ) (i.e., Automatic Repeat reQuest) procedure that relies on acknowledgment messages to verify reception of a transmitted message, such that a transmitting network device may retry transmission if an acknowledgment (ACK) message is no timely received. Reliance on an ACK message in a wireless deterministic network is inconsistent with the stated goals of deterministic networks providing minimal packet loss with minimal latency, as any packet loss is unlikely to be resolved by a retransmission in response to a detected absence of an ACK message; further, reliance on an ACK message can result in increased latency, especially when ARQ is used for additional time slots allocated for retry attempts between a transmitter and a receiver device.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
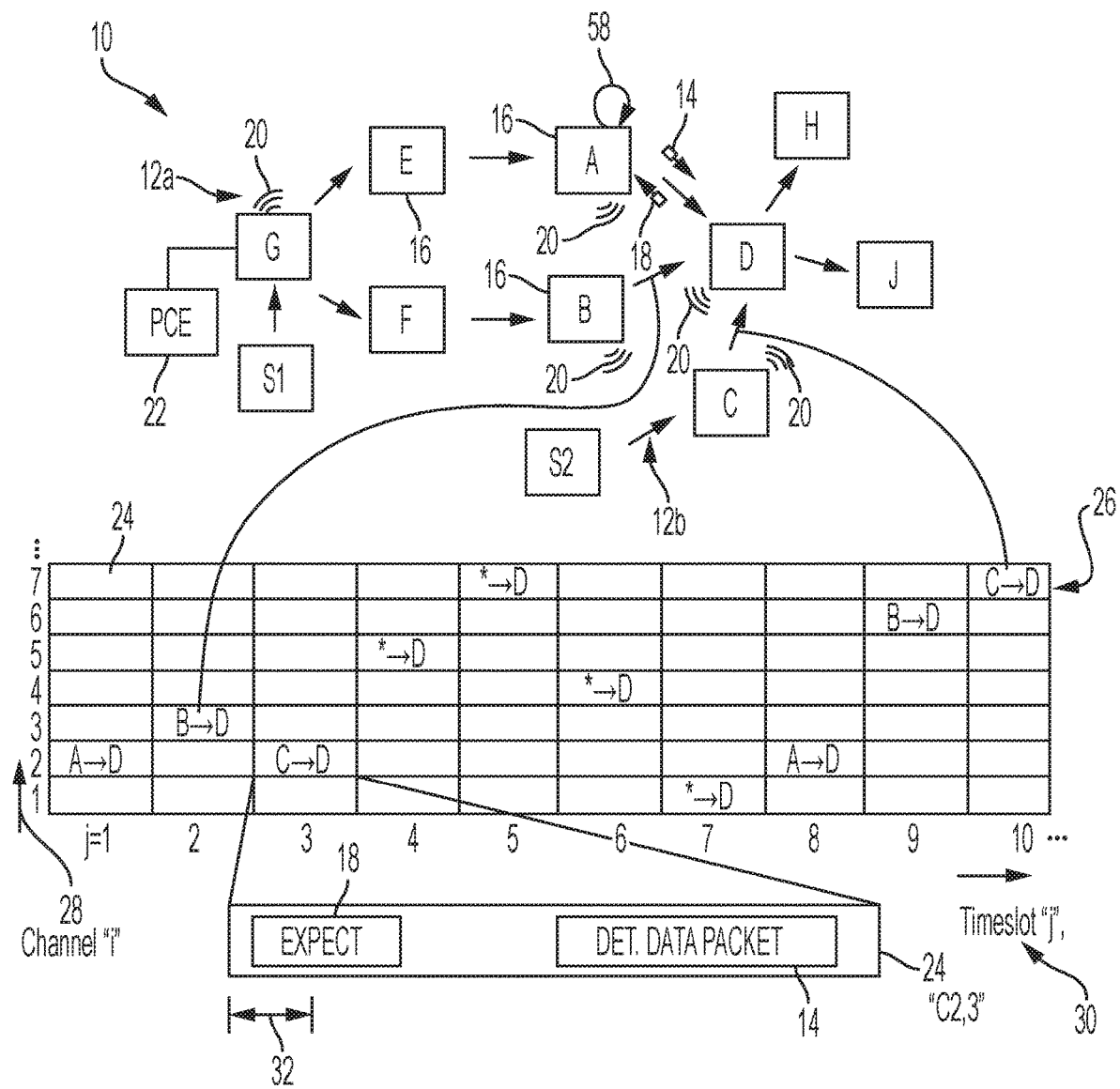
FIG. 1 illustrates an example system having an apparatus for causing wireless deterministic transmission of an expected data packet by transmitting an expectation message at initiation of an allocated time slot, according to an example embodiment.

In one embodiment, a method comprises: identifying, by a receiving network device, a deterministic schedule comprising allocated time slots, each allocated time slot allocated for the receiving network device receiving a data packet from one of a plurality of transmitting network devices in a wireless deterministic data network; and selectively transmitting, by the receiving network device, an expectation message at initiation of each of the allocated time slots, each expectation message preempting transmission by any other network device during the corresponding allocated time slot, each expectation message generated by the receiving network device and identifying a corresponding transmitting network device that is expected to deterministically transmit a corresponding expected data packet to the receiving network device during the corresponding allocated time slot; the expectation message causing the corresponding identified transmitting network device to transmit the corresponding expected data packet during the corresponding allocated time slot.

In another embodiment, an apparatus is implemented as a physical machine. The apparatus comprises: non-transitory machine readable media configured for storing executable machine readable code; a device interface circuit configured for receiving a data packet via a deterministic network; and a processor circuit. The processor circuit is configured for executing the machine readable code, and when executing the machine readable code operable for: identifying, by the apparatus implemented as a receiving network device, a deterministic schedule comprising allocated time slots, each allocated time slot allocated for the receiving network device receiving a data packet from one of a plurality of transmitting network devices in a wireless deterministic data network; and selectively transmitting, by the device interface circuit, an expectation message at initiation of each of the allocated time slots, each expectation message preempting transmission by any other network device during the corresponding allocated time slot, each expectation message generated by the processor circuit and identifying a corresponding transmitting network device that is expected to deterministically transmit a corresponding expected data packet to the receiving network device during the corresponding allocated time slot. The expectation message causes the corresponding identified transmitting network device to transmit the corresponding expected data packet during the corresponding allocated time slot.

In another embodiment, one or more non-transitory tangible media are encoded with logic for execution by a machine and when executed by the machine operable for: identifying, by the machine implemented as a receiving network device, a deterministic schedule comprising allocated time slots, each allocated time slot allocated for the receiving network device receiving a data packet from one of a plurality of transmitting network devices in a wireless deterministic data network; and selectively transmitting, by the receiving network device, an expectation message at initiation of each of the allocated time slots, each expectation message preempting transmission by any other network device during the corresponding allocated time slot, each expectation message generated by the receiving network device and identifying a corresponding transmitting network device that is expected to deterministically transmit a corresponding expected data packet to the receiving network device during the corresponding allocated time slot. The expectation message causes the corresponding identified transmitting network device to transmit the corresponding expected data packet during the corresponding allocated time slot.

DETAILED DESCRIPTION

Particular embodiments optimize wireless deterministic transmissions in a wireless deterministic data network by causing a receiving network device to selectively transmit, at initiation of an allocated time slot, an expectation message that preempts transmission by any other network device during the corresponding time slot, and that causes a corresponding identified transmitting network device to deterministically transmit an expected data packet during the corresponding allocated time slot. In particular, the example embodiments reverse the order of transmission in a time slot of a deterministic schedule, where a receiving network device transmits, at initiation of an allocated time slot and during a Clear Channel Assessment (CCA) phase of the allocated time slot, an expectation message that identifies that a corresponding transmitting network device is expected to deterministically transmit a corresponding expected data packet to the receiving network device during the current allocated time slot.

Hence, the expectation message causes the corresponding identified transmitting network device to transmit the corresponding expected data packet during the corresponding allocated time slot. Hence, the example embodiments eliminate wasteful use of an acknowledgment message in a deterministic time slot, which typically is ineffective in a wireless deterministic network and increases overall latency in a wireless deterministic network.

The example embodiments optimize the wireless deterministic transmissions by causing transmission of an expectation message by a receiving network device to trigger the wireless deterministic transmission of the expected data packet in the same time slot as the expectation message. Moreover, the example embodiments optimize the wireless deterministic transmissions by enabling a receiving network device to select a transmitting network device for a retransmission within a secondary allocated time slot reserved for retransmissions ("retries"), as opposed to requiring allocation of specific transmitter-receiver pairs for each retry time slot. Hence, a receiving network device can cause retransmissions by selected transmitting network devices within selected secondary allocated time slots, as needed, optimizing use of retransmissions using a reduced number of secondary allocated time slots.

The example embodiments also optimize use of the secondary allocated time slots, as a receiving network device can selectively suppress transmission of an expectation message at initiation of a secondary allocated time slot if an expected data packet is already received (either from the expected transmitting network device or from another transmitting network device having transmitted a duplicate of the expected data packet). Hence, the selective suppression of transmitting an expectation message enables the secondary allocated time slot to be reclaimed by another network device detecting that the wireless transmission medium is quiescent (i.e., "silent") after expiration of the Clear Channel Assessment (CCA) phase at the beginning of the corresponding allocated time slot.

FIG. 1 illustrates an example wireless deterministic network system (i.e., deterministic network) 10 providing one or more wireless deterministic tracks (e.g., 12a, 12b) for deterministic forwarding of a data packet 14, by a wireless network device (e.g., "A") 16, in response to reception of an expectation message 18 by a receiving wireless network device (e.g., "D") 16, according to an example embodiment. Each deterministic track 12 comprises one or more multi-hop deterministic paths providing scheduled transmissions, each scheduled transmission between a single transmitting network device and a single receiving network device.

FIG. 1 illustrates the wireless deterministic network 10 providing deterministic transmission of an identified flow of data packets 14 originated by a source network device "S1" 16 and destined for a destination network device "H" via a first deterministic track 12a that can comprise the multi-hop deterministic path "G-E-A-D-H" and the multi-hop deterministic path "G-F-B-D-H": the wireless network device "G" 16 can be configured to operate as a replication node for insertion of the identified flow originated by "S1" into the respective multi-hop deterministic paths "E-A-D" and "F-B-D" via wireless deterministic data links (e.g., 6TiSCH or RAW) 20; the wireless network device "D" 16 can be configured to operate as an elimination node for the identified flow originated by "S1" in order to eliminate any duplicate packets, for deterministic delivery of the identified flow of data packets to the destination network device "H". Each deterministic track 12 (comprising one or more multi-hop deterministic paths and associated deterministic transmission and reception schedules can be established by a management device such as a Path Computation Element (PCE) 22.

FIG. 1 also illustrates the PCE 22 establishing a second wireless deterministic track 12b providing deterministic transmission of a second identified flow of data packets 14 originated by a source network device "S2" 16 and destined for a destination network device "J" via a multi-hop deterministic path "C-D-J".

Each scheduled transmission is based on allocation of cells 24 (e.g., "Ci,j") by the PCE 22 from a repeating CDU matrix 26 (i.e., repeating deterministic schedule), each cell (e.g., "Ci,j") 24 representing a unique wireless channel "i" 28 at a unique timeslot "j" (i.e., time slot) 30. As illustrated in FIG. 1, the CDU matrix 26 (e.g., implemented according to 6TiSCH) can provide sixteen (16) wireless channels over thirty-one (31) ten millisecond (10 ms) timeslots, providing a total instance duration of 310 ms. Hence, the CDU matrix 26 provides a repeatable deterministic schedule (i.e., a repeating distribution of deterministic slots such as cells 26), enabling establishment of deterministic tracks 12 in the deterministic network 10 for different data flows among different wired or wireless network devices 16. Hence, depending on the allocation by the PCE 22, the repeating CDU matrix 26 enables the source network device "S1" or "S2" to transmit, at a minimum, another data packet 14 (e.g., of an identified flow) on each successive instance of the deterministic track 12 in the corresponding instance of the CDU matrix 26.

Hence, FIG. 1 illustrates that the wireless network device "A" can deterministically transmit to the receiving network device "D" a data packet 14 (e.g., for an identified flow "F1") at the scheduled slot times "j=1" and "j=8" associated with the allocated cells "C2,1" and "C2,8" 24, respectively, illustrated by the designation "A→D". The wireless network device "B" can deterministically transmit a data packet 14 (e.g., replicated for an identified flow "F1") to the receiving network device "D" at the scheduled slot times "j=2" and "j=9" associated with the allocated cells "C3,2" and "C6,9" 24, respectively illustrated by the designation "B→D". The wireless network device "C" can deterministically transmit a data packet 14 (e.g., for an identified flow "F2") to the receiving network device "D" at the scheduled slot times "j=3" and "j=10" associated with the allocated cells "C2,3" and "C7,10" 24, respectively illustrated by the designation "C→D".

The cells 24 allocated from the deterministic schedule 26 by the PCE 22 for transmission by a specific transmitting network device to a specific destination device as described above with respect to cells "C2,1", "C3,2", "C2,3", "C2,8", "C6,9", and "C7,10" are referred to herein as "primary" or "first" allocated time slots, referring to a "primary" or "first" opportunity for a specific transmitting network device (e.g., "A") to deterministically transmit a data packet 14 to a specific receiving network device (e.g., "D"). Hence, the network device "D" 16 is able to identify, based on instructions from the PCE 22 or another network device, the deterministic schedule that comprises the allocated primary time slots "C2,1", "C3,2", "C2,3", "C2,8", "C6,9", and "C7,10" for deterministic reception of a data packet (e.g., according to an identified flow "F1" or "F2") from an identified transmitting network device "A", "B", or "C" 16.

According to example embodiments, the receiving network device "D" 16 can generate and send an expectation message 18 at the initiation of an allocated time slot 24 ("time slot" is referred to herein instead of "cell", as the channel frequency 28 can be considered "generic" for the purposes of the description below). The receiving network device "D" 16 can generate the expectation message 18 based on identifying the time slot "C2,3" 24 as allocated for the deterministic reception "C→D" of an identified data packet 14 from the transmitting network device "C" 16. As illustrated in FIG. 1, the receiving network device "D" can generate the expectation message 18 and transmit the expectation message 18 at the initiation of the time slot "C2,3" 24, for example during a Clear Channel Assessment (CCA) phase 32 at the beginning of the corresponding allocated time slot "C2,3" 24.

Figure 2:
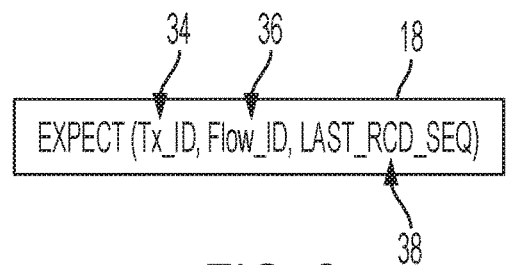
FIG. 2 illustrates an example expectation message generated and output by a receiving network device, according to an example embodiment.

FIG. 2 illustrates an example expectation message 18 generated and output by a receiving network device (e.g., "D") at the initiation of an allocated time slot (e.g., "C2,3") 24, according to an example embodiment. The expectation message 18 can specify a transmitting network device identifier "Tx_ID" 34 that identifies the transmitting network device for the allocated time slot 24. The expectation message 18 also can specify a flow identifier "Flow_ID" 36 for the identified data flow of data packets (e.g., originated by the source network device "S1"). The expectation message 18 also can specify a sequence identifier 38: depending on implementation, the sequence identifier 38 can specify the last received sequence identifier ("LAST_RCD_SEQ") or the next expected sequence identifier (e.g., "NEXT_SEQ").

As illustrated in FIG. 1, the transmission of the expectation message 18 by the receiving network device "D" during the CCA phase 32 at the beginning of the time slot "C2,3" 24 causes the transmitting network device "C" to deterministically transmit the deterministic data packet 14 within the same time slot "C2,3" 24. Hence, the expectation message 18 serves as a "trigger" that causes the transmitting network device "C" to begin transmission of the expected data packet that is expected by both the transmitting network device "C" and the receiving network device "D" to be transmitted within the time slot "C2,3" 24.

As described below, the use of the expectation message 18 by the receiving network device "D" 16 to trigger deterministic transmission by a transmitting network device can improve overall latency in the wireless deterministic network 10 by reducing the number of secondary time slots needed for retransmission of a data packet that was not received during transmission in the primary allocated time slot. In particular, the PCE 22 can allocate secondary time slots (designated "*→D") "C5,4", "C7,5", "C4,6" and "C1,7" for retransmission to the receiving network device "D" 16 of a data packet from any transmitting network device (e.g., "*=A, B, or C") chosen by the receiving network device "D" 16. Hence, the receiving network device "D" 16 can select any of the transmitting network devices for retransmission, as needed, during one of the secondary time slots "*→D" based on specifying in the expectation message 18 the corresponding transmitting network device identifier "Tx_ID" 34 of the transmitting network device expected to retransmit its data packet, as opposed to requiring a dedicated retransmission slot (e.g., "A→D") for a specific transmitting network device ("A") and a specific receiving network device ("D").

As described below, the example embodiments also enable reclaiming of any unused secondary time slot "*→D" based on a determined absence of any expectation message 18 after expiration of the corresponding CCA phase 32 within the time slot 24. Hence, selection of retransmitting network devices as needed in combination with enabling reclaiming of unused secondary time slots that are not needed for retry attempts optimizes the wireless deterministic network 10 for minimal latency (requiring fewer retry time slots) and optimizes use of packet replication and elimination for lost packet recovery, minimizing the need for retransmission attempts.

Figure 3:
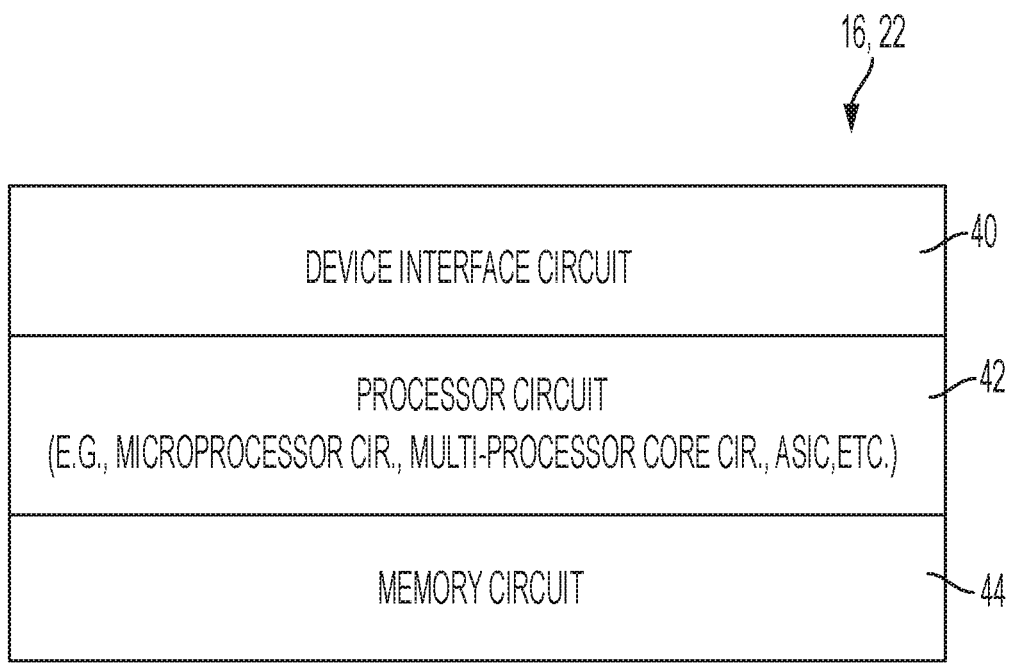
FIG. 3 illustrates an example implementation of any one of the network devices of FIG. 1, according to an example embodiment.

FIG. 3 illustrates an example implementation of any one of the devices 16 and/or 22 of FIG. 1, according to an example embodiment. Each apparatus 16 and/or 22 is a physical machine (i.e., a hardware device) configured for implementing network communications with other physical machines 16 and/or 22 via the network 10. The term "configured for" or "configured to" as used herein with respect to a specified operation refers to a device and/or machine that is physically constructed and arranged to perform the specified operation.

Each apparatus 16 and/or 22 can include a device interface circuit 40, a processor circuit 42, and a memory circuit 44. The device interface circuit 40 can include one or more distinct physical layer transceivers for communication with any one of the other devices 16 and/or 22; for example, the device interface circuit 40 can include an IEEE 802.15.4e transceiver for wireless deterministic network communications, for example based on sending and receiving data packets via a wireless 6TiSCH link 46 according to 6TiSCH, or a Reliable Available Wireless (RAW)-based protocol. The processor circuit 42 can be configured for executing any of the operations described herein, and the memory circuit 44 can be configured for storing any data or data packets as described herein.

Any of the disclosed circuits of the devices 16 and/or 22 (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 44 can be implemented dynamically by the processor circuit 42, for example based on memory address assignment and partitioning executed by the processor circuit 42.

Figure 4A:
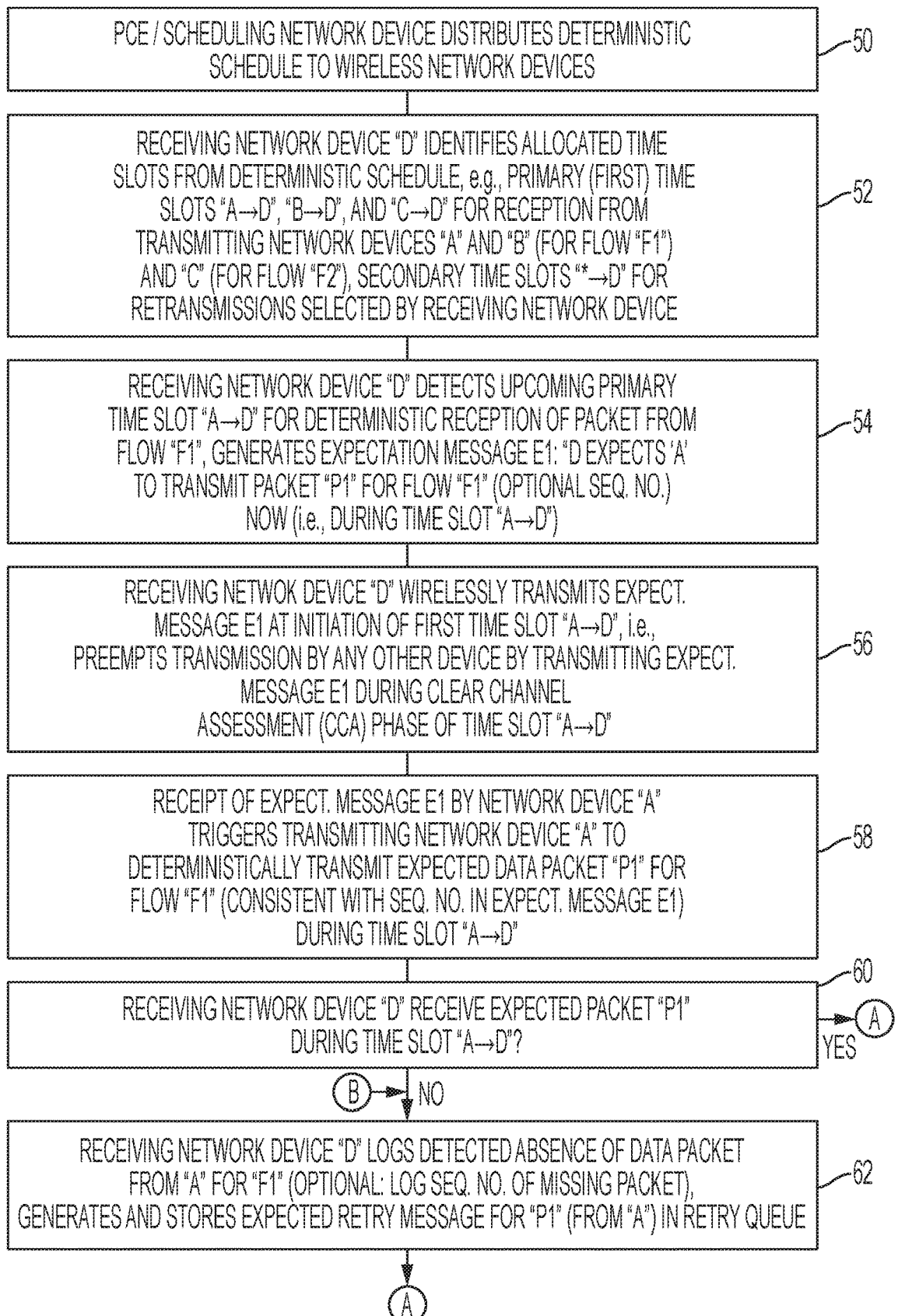
FIGS. 4A and 4B summarize an example method of causing wireless deterministic transmission of an expected data packet by a receiving network device transmitting an expectation message at initiation of an allocated time slot, according to an example embodiment.
Figure 4B:
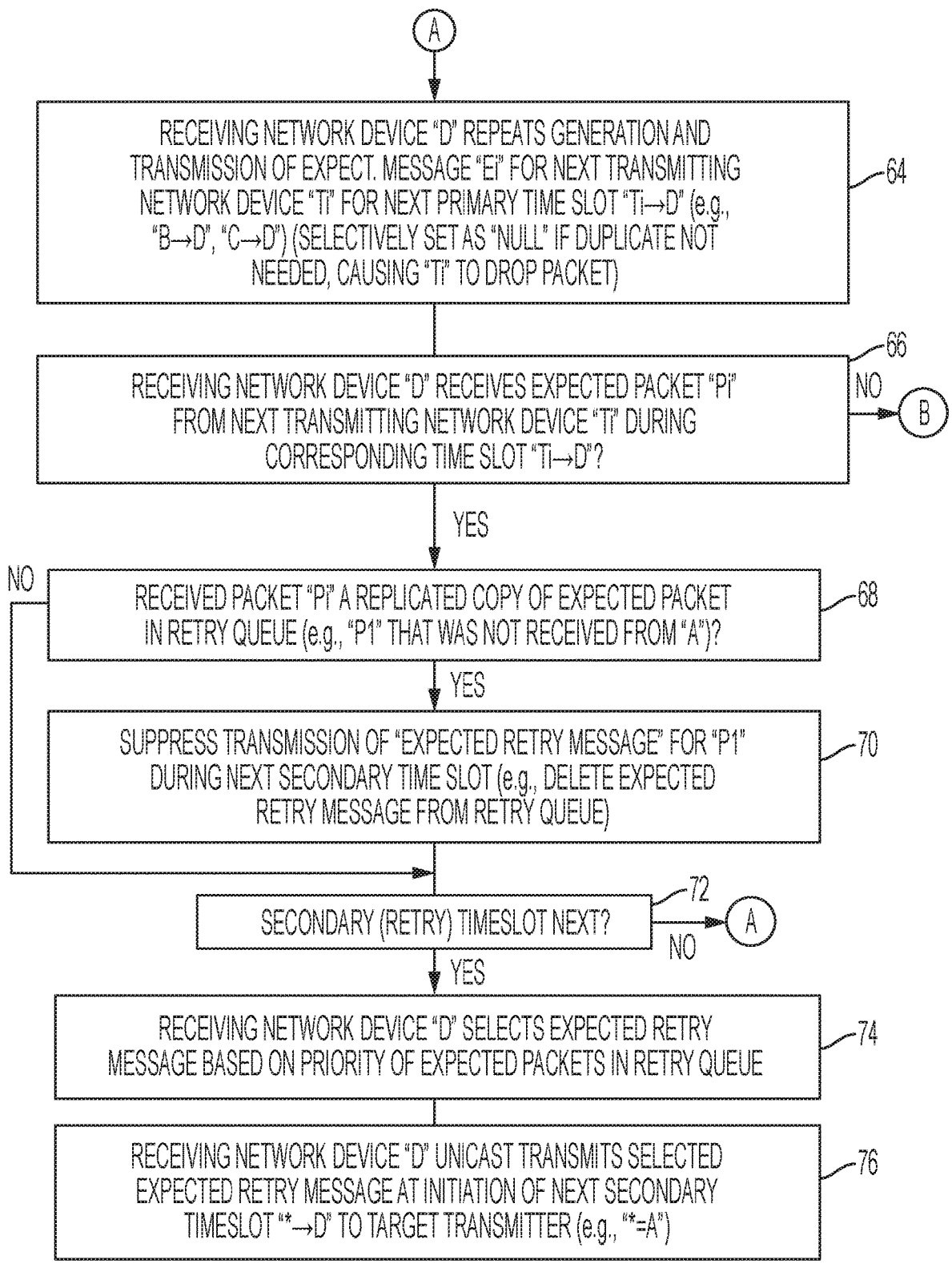

FIGS. 4A and 4B summarize an example method of causing wireless deterministic transmission of an expected data packet 14 by a receiving network device (e.g., "D") 16 transmitting an expectation message 18 at initiation of an allocated time slot 24, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to FIGS. 1 and 4A, the processor circuit 42 of the PCE 22 in operation 50 can establish the deterministic schedule 26 illustrated in FIG. 1, including deterministic transmit-receive cells 24 for each of the wireless network devices 16. Although FIG. 1 illustrates allocated time slots 24 only for the receiving network device "D" 16 to avoid cluttering of the Figure, the PCE 22 can allocate, from within the deterministic schedule 26, a plurality of time slots "$C_{i,j}$" for each of the wireless network devices 16 based on establishment of the wireless deterministic tracks 12 comprising one or more deterministic paths for deterministic transmission of a data packet along an identified multi-hop path according to a deterministic schedule 26 established by the PCE 22.

Hence, the PCE 22 in operation 50 can distribute instructions that enable each network device (e.g., the receiving network device "D" 16) to determine its corresponding deterministic schedule for deterministic reception and transmission of one or more identified flows of data packets.

The processor circuit 42 of the receiving network device "D" 16 in operation 52 can identify its deterministic receive schedule "A→D", "B→D", "C→D", and "*→D" based on the instructions received from the PCE 22. The processor circuit 42 of the receiving network device "D" 16 in operation 52 can identify the primary (first) allocated time slots "A→D" (e.g., "$C_{2,1}$" and "$C_{2,8}$" for identified data flow "F1") 24, "B→D" (e.g., "$C_{3,2}$" and "$C_{6,9}$" for identified data flow "F1") 24, and "C→D" (e.g., "$C_{2,3}$" and "$C_{7,10}$" for identified data flow "F2") 24 allocated for reception of data packets 14 from identified transmitting network devices "A", "B", and "C", respectively. The processor circuit 42 of the receiving network device "D" 16 in operation 52 also can identify the secondary time slots "*→D" 24 that are allocated to the receiving network device "D" 16 for any retransmissions from any one of the transmitting network devices "A", "B", and/or "C" as selected by the receiving network device "D" 16, described below. The processor circuit 42 of the receiving network device "D" 16 in operation 52 can store its deterministic receive schedule in its memory circuit 44 and/or a local memory in the processor circuit 42 and/or the device interface circuit 40.

The processor circuit 42 of the receiving network device "D" 16 in operation 54 can detect the next upcoming primary time slot "A→D" (e.g., "$C_{2,1}$") 24 for receiving a data packet 14 from the identified data flow "F1", for example based on comparing its internal clock value to the timeslot value of the next upcoming time slot "A→D" (e.g., "C2,1") 24 relative to an epochal start time in the wireless deterministic network 10. The processor circuit 42 of the receiving network device "D" 16 in operation 54 can generate an expectation message "E1" 18 for transmission at the initiation of the upcoming time slot "A→D" (e.g., "C2,1") 24. The expectation message "E1" 18 can provide a notification to the transmitting network device "A" 16 (scheduled for transmission at the upcoming time slot "C2,1" 24) that the receiving network device "D" 16 is expecting transmitting network device "A" 16 to transmit the next deterministic data packet (e.g., "P1" for an identified flow "F1").

In one embodiment, the expectation message 18 can be as simple as a notification that the receiving network device is expecting transmission as scheduled during a primary time slot, with implicit reliance of the transmitting network device initiating scheduled transmission of the scheduled data packet according to its own deterministic schedule. As described below, the expectation message 18 also can specify the transmitting network device identifier "Tx_ID" 34, the flow identifier 36, the sequence identifier 38, and even a cell identifier, resulting in an absolutely explicit specification of the transmission parameters for the associated time slot 24.

The processor circuit 42 of the receiving network device "D" 16 in operation 56 can cause the device interface circuit 40 to wirelessly transmit the expectation message "E1" 18 at the initiation of the allocated time slot "A→D" (e.g., "C2,1") 24, for example during the CCA phase 32. The transmission of the expectation message "E1" 18 at the initiation of the allocated time slot 24 (e.g., during the CCA phase 32 illustrated in FIG. 1) preempts transmission of any other data packet during the corresponding allocated time slot 24, as any wireless network device must defer to the detected transmission of the expectation message 18 during the CCA phase 32. Hence, the transmission of the expectation message 18 at the initiation of the allocated time slot 24 can prevent interference from any non-deterministic network device within the interference domain that attempts to transmit a non-deterministic data packet, for example according to a CSMA/CA collision avoidance protocol.

The expectation message "E1" 18 transmitted by the receiving network device "D" 16 causes (i.e., "triggers") in operation 58 the transmitting network device "A" 16 to deterministically transmit its expected data packet "P1" 14, for example for the identified flow "F1" (and consistent with any sequence identifier 38 specified in the expectation message "E1" 18) during the allocated time slot "A→D" (e.g., "C2,1") 24.

If in operation 60 the receiving network device "D" 16 receives the expected data packet "P1" 14 during the allocated time slot "A→D" (e.g., "C2,1") 24, the processor circuit 42 of the receiving network device "D" 16 can bypass operation 62 and proceed to operation 64 of FIG. 4B.

However if in operation 60 the receiving network device "D" 16 detects an absence of receiving the expected data packet "P1" 14 during the allocated time slot "A→D" (e.g., "C2,1") 24, the processor circuit 42 of the receiving network device "D" 16 in operation 62 can log within a data structure (e.g., in the memory circuit 44) the detected absence of receiving the expected data packet "P1" from the transmitting network device "A" 16 for the identified flow "F1"; the processor circuit 42 of the receiving network device "D" 16 also can store the sequence identifier 38 of the missing data packet. The processor circuit 42 of the receiving network device "D" 16 in operation 62 can generate and store in a retry queue (e.g., in the memory circuit 44, the processor circuit 42, and/or the device interface circuit 40) an expected retry message 18 for the missing data packet "P1" 14 for selective transmission during an upcoming secondary allocated time slot "*→D" (e.g., "C5,4") 24.

The expected retry message 18 stored in the retry queue explicitly specifies the transmitting network device identifier "Tx_A" 34, enabling the transmitting network device "A" to identify that it needs to retransmit the missing data packet during the corresponding allocated secondary time slot "*→D".

Referring to FIG. 4B, the processor circuit 42 of the receiving network device "D" 16 in operation 64 can repeat operations 54 and 56 for the generation and transmission of a corresponding expectation message "Ei" for the next expected packet "Pi" by the transmitting network device "Ti" in the next allocated primary time slot "Ti→D" (e.g., "B→D", or "C→D") 24, where "i=2, 3, etc." and "Ti" is the next scheduled transmitting network device "B" or "C". Similarly, the processor circuit 42 of the receiving network device "D" 16 in operation 66 can repeat operation 60 and determine if the expected packet "Pi" is received in the corresponding time slot "Ti→D" 24.

The processor circuit 42 of the receiving network device "D" 16 in operation 64 also can generate and send in the next allocated primary time slot a "null" expectation message that specifies "nothing", as opposed to specifying an identifiable data frame from an identifiable transmitting network device as illustrated in FIG. 2. The processor circuit 42 of the receiving network device "D" 16 can generate the null expectation message in response to determining that deterministic transmission of a replicated packet (e.g., from transmitting network device "B" in the next scheduled primary time slot "B→D" at "C3,2") is not needed due to prior successful reception of the same data packet (e.g., from the transmitting network device "A" at the primary time slot "A→D" at "C2,1").

Hence, transmission of a null expectation message at the beginning of the primary time slot "B→D" at "C3,2" by the receiving network device "D" 16 can cause the transmitting network device "B" to drop the replicated packet, enabling another network device to reclaim the time slot "C3,2" upon expiration of the corresponding CCA interval 32, described below. The null expectation message also can notify the transmitting network devices "A" and "B" (and other neighboring network devices) that the upcoming retry slots "*→D" are not needed for the successfully-received data packet (and therefore could be potentially reclaimed).

If in operation 66 the processor circuit 42 of the receiving network device "D" 16 detects that the expected packet "Pi" is not received within the corresponding timeslot "Ti→D" 24, the processor circuit 42 of the receiving network device "D" 16 repeats operation 62 of FIG. 4A and logs the absence of the expected data packet "Pi" from the associated transmitting network device "Ti" (e.g., "B" or "C"), and generates and stores an expected retry message for the expected data packet "Pi" in its retry queue. The expected retry message 18 stored in the retry queue explicitly specifies the transmitting network device identifier "Tx_ID" 34, enabling the transmitting network device "Ti" to identify that it needs to retransmit the missing data packet during the corresponding allocated secondary time slot "*→D".

If in operation 66 the processor circuit 42 of the receiving network device "D" 16 detects that the expected packet "Pi" is received within the corresponding timeslot "Ti→D" 24, the processor circuit 42 of the receiving network device "D" 16 in operation 68 can determine in operation 68 whether the received packet "Pi" is a replicated copy of an expected packet awaiting retransmission in the retry queue. For example, if in operation 68 the received packet "Pi" (received from the transmitting network device "B" 16 during the time slot "B→D" "C3,2" 24) is a replicated copy of the expected data packet "P1" that was expected from transmitting network device "A" 16 during the time slot "A→D" "C2,1" 24, the processor circuit 42 of the receiving network device "D" 16 in operation 70 can suppress transmission of the expected retry message for the missing data packet "P1" from the transmitting network device "A" 16 during an upcoming secondary (retry) time slot "*→D", for example based on deleting the retry message for the data packet "P1" from the retry queue. The suppressed transmission of the expected retry message enables another network device to reclaim the unused retry time slot "*→D" in response to a determined absence of any message transmission during the CCA interval 32.

If in operation 72 the processor circuit 42 of the receiving network device "D" 16 determines that the next upcoming allocated time slot 24 is a primary time slot, the processor circuit 42 of the receiving network device "D" 16 repeats operations 64 and 66 for the next primary time slot (e.g., "C→D" "C2,3)" 24.

If in operation 72 the processor circuit 42 of the receiving network device "D" 16 determines that the next upcoming allocated time slot 24 is a secondary time slot "*→D" 25 allocated for retransmissions by any of the transmitting network devices "A", "B", or "C" as selected by the receiving network device "D" 16, the processor circuit 42 of the receiving network device "D" 16 in operation 74 can select the selected retry message (e.g. from the retry queue) based on determining the relative priority of each of the expected packets in the retry queue; the processor circuit 42 of the receiving network device "D" 16 in operation 74 also can select a retry message (from among multiple expected packets awaiting retransmission) based on a round-robin or random selection for equal-priority expected packets.

The processor circuit 42 of the receiving network device "D" 16 in operation 76 can unicast transmit the selected expected retry message 18 at the initiation of the next secondary time slot "*→D" to the selected target transmitting network device (e.g., "A"), enabling the transmitting network device "A" to retransmit the expected data packet "P1" at the secondary time slot "C5,4". If the retransmission is successful, the processor circuit 42 of the receiving network device "D" 16 can return to operation 74 for the next expected packet in the retry queue for the next secondary time slot "*→D", else the processor circuit 42 of the receiving network device "D" 16 can return to operation 64 if the retry queue is empty of if the next allocated time slot is a primary time slot.

According to example embodiments, a pre-acknowledgment expectation message is transmitted by a receiving network device at an initiation of a deterministic time slot in a wireless deterministic network. The expectation message preempts any transmission by other network devices in range of the receiving network device transmitting the expectation message. The receiving network device can specify in the expectation message the flow identifier and the transmitting network device that is expected by the receiver. The expectation message can be utilized in dedicated primary time slots to trigger transmission of a deterministic data packet to the receiving network device; the expectation message also can be utilized in shared time slots to request a retransmission from one of a plurality of identified data flows.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   identifying, by a receiving network device, a deterministic schedule comprising allocated time slots, each allocated time slot allocated for the receiving network device receiving a data packet from one of a plurality of transmitting network devices in a wireless deterministic data network; and
   selectively transmitting, by the receiving network device, an expectation message at initiation of each of the allocated time slots, each expectation message preempting transmission by any other network device during the corresponding allocated time slot, each expectation message generated by the receiving network device and identifying a corresponding transmitting network device that is expected to deterministically transmit a corresponding expected data packet to the receiving network device during the corresponding allocated time slot;
   the expectation message causing the corresponding identified transmitting network device to transmit the corresponding expected data packet during the corresponding allocated time slot;
   the method further comprising suppressing transmission of the expectation message during one of the allocated time slots reserved for retransmissions in response to reception of the corresponding expected data packet during an earlier second allocated time slot, the suppressing transmission causing another network device to reclaim the one allocated time slot in response to a determined absence of the expectation message.

2. The method of claim 1, wherein the expectation message eliminates any necessity of any acknowledgment message following transmission of the expected data packet during the corresponding allocated time slot.

3. The method of claim 1, wherein the suppressing transmission includes:
   detecting, during a corresponding third allocated time slot allocated for a first transmitting network device and earlier than the second allocated time slot, an absence of receiving the expected data packet from the first transmitting network device following transmission, by the receiving network device, of the corresponding expectation message identifying the first transmitting network device is expected to deterministically transmit the expected data packet during the third allocated time slot; and
   receiving the expected data packet during the second allocated time slot from a second transmitting network device following transmission, by the receiving network device, of the corresponding expectation message identifying the second transmitting network device is expected to deterministically transmit the expected data packet during the second allocated time slot.

4. The method of claim 1, wherein:
   the identifying includes identifying, among the allocated time slots, first allocated time slots allocated for reception of data packets from respective transmitting network devices and second allocated time slots allocated for retransmission by any of the respective transmitting network devices selected by the receiving network device;

the method further comprises the receiving network device detecting an absence of receiving a first expected data packet during a corresponding one of the first allocated time slots following the corresponding expectation message identifying the first expected data packet from a first transmitting network device, and selecting any one of the second allocated time slots for retransmission of the first expected data packet;
the selectively transmitting including the receiving network device transmitting, during the one second allocated time slot, a second expectation message identifying the first transmitting network device is expected to retransmit the first expected data packet.

5. The method of claim 4, further comprising the receiving network device selecting the first expected data packet for retransmission based on a determined priority relative to a second expected data packet awaiting retransmission.

6. The method of claim 1, wherein the selectively transmitting includes the receiving network device inserting, into the expectation message, a device identifier for the corresponding transmitting network device, and an identifier associated with the corresponding expected data packet.

7. The method of claim 6, wherein the identifier associated with the corresponding expected data packet includes at least one of a flow identifier or a sequence identifier.

8. The method of claim 1, wherein the selectively transmitting includes transmitting the expectation message during a Clear Channel Assessment (CCA) phase at a beginning of the corresponding allocated time slot, the expectation message causing any other network device detecting the expectation message during the CCA phase to refrain from any transmission during the corresponding allocated time slot.

9. The method of claim 1, wherein:
the method further comprises the network device determining an upcoming data packet does not need to be transmitted during an upcoming allocated time slot by a corresponding scheduled transmitting network device;
the selectively transmitting includes generating and sending, at initiation of the upcoming allocated time slot, a null expectation message that causes the corresponding scheduled transmitting network device to drop the upcoming data packet.

10. An apparatus implemented as a physical machine, the apparatus comprising:
non-transitory machine readable media configured for storing executable machine readable code;
a device interface circuit configured for receiving a data packet via a deterministic network; and
a processor circuit configured for executing the machine readable code, and when executing the machine readable code operable for:
identifying, by the apparatus implemented as a receiving network device, a deterministic schedule comprising allocated time slots, each allocated time slot allocated for the receiving network device receiving a data packet from one of a plurality of transmitting network devices in a wireless deterministic data network, and
selectively transmitting, by the device interface circuit, an expectation message at initiation of each of the allocated time slots, each expectation message preempting transmission by any other network device during the corresponding allocated time slot, each expectation message generated by the processor circuit and identifying a corresponding transmitting network device that is expected to deterministically transmit a corresponding expected data packet to the receiving network device during the corresponding allocated time slot;
the expectation message causing the corresponding identified transmitting network device to transmit the corresponding expected data packet during the corresponding allocated time slot;
wherein the processor circuit is configured for suppressing transmission of the expectation message during one of the allocated time slots reserved for retransmissions in response to reception of the corresponding expected data packet during an earlier second allocated time slot, the suppressing transmission causing another network device to reclaim the one allocated time slot in response to a determined absence of the expectation message.

11. The apparatus of claim 10, wherein the expectation message eliminates any necessity of any acknowledgment message following transmission of the expected data packet during the corresponding allocated time slot.

12. The apparatus of claim 10, wherein the processor circuit is configured for:
detecting, during a corresponding third allocated time slot allocated for a first transmitting network device and earlier than the second allocated time slot, an absence of receiving the expected data packet from the first transmitting network device following transmission, by the receiving network device, of the corresponding expectation message identifying the first transmitting network device is expected to deterministically transmit the expected data packet during the third allocated time slot; and
receiving the expected data packet during the second allocated time slot from a second transmitting network device following transmission, by the receiving network device, of the corresponding expectation message identifying the second transmitting network device is expected to deterministically transmit the expected data packet during the second allocated time slot.

13. The apparatus of claim 10, wherein:
the processor circuit is configured for identifying, among the allocated time slots, first allocated time slots allocated for reception of data packets from respective transmitting network devices and second allocated time slots allocated for retransmission by any of the respective transmitting network devices selected by the processor circuit;
the processor circuit further configured for detecting an absence of receiving a first expected data packet during a corresponding one of the first allocated time slots following the corresponding expectation message identifying the first expected data packet from a first transmitting network device, and selecting any one of the second allocated time slots for retransmission of the first expected data packet;
the processor circuit further configured for causing the device interface circuit to transmit, during the one second allocated time slot, a second expectation message identifying the first transmitting network device is expected to retransmit the first expected data packet.

14. The apparatus of claim 10, wherein the processor circuit is configured for inserting, into the expectation message, a device identifier for the corresponding transmitting network device, and an identifier associated with the corresponding expected data packet.

15. The apparatus of claim 10, wherein the selectively transmitting includes transmitting the expectation message during a Clear Channel Assessment (CCA) phase at a beginning of the corresponding allocated time slot, the expectation message causing any other network device detecting the expectation message during the CCA phase to refrain from any transmission during the corresponding allocated time slot.

16. The apparatus of claim 10, wherein the processor circuit is configured for:
  determining an upcoming data packet does not need to be transmitted during an upcoming allocated time slot by a corresponding scheduled transmitting network device;
  generating and sending, at initiation of the upcoming allocated time slot, a null expectation message that causes the corresponding scheduled transmitting network device to drop the upcoming data packet.

17. One or more non-transitory tangible media encoded with logic for execution by a machine and when executed by the machine operable for:
  identifying, by the machine implemented as a receiving network device, a deterministic schedule comprising allocated time slots, each allocated time slot allocated for the receiving network device receiving a data packet from one of a plurality of transmitting network devices in a wireless deterministic data network; and
  selectively transmitting, by the receiving network device, an expectation message at initiation of each of the allocated time slots, each expectation message preempting transmission by any other network device during the corresponding allocated time slot, each expectation message generated by the receiving network device and identifying a corresponding transmitting network device that is expected to deterministically transmit a corresponding expected data packet to the receiving network device during the corresponding allocated time slot;
  the expectation message causing the corresponding identified transmitting network device to transmit the corresponding expected data packet during the corresponding allocated time slot;
  the one or more non-transitory tangible media further operable for suppressing transmission of the expectation message during one of the allocated time slots reserved for retransmissions in response to reception of the corresponding expected data packet during an earlier second allocated time slot, the suppressing transmission causing another network device to reclaim the one allocated time slot in response to a determined absence of the expectation message.

18. The one or more non-transitory tangible media of claim 17, wherein the expectation message eliminates any necessity of any acknowledgment message following transmission of the expected data packet during the corresponding allocated time slot.

* * * * *